United States Patent [19]

Muth et al.

[11] Patent Number: 4,485,688
[45] Date of Patent: Dec. 4, 1984

[54] CONNECTING ELEMENT FOR LINKAGES, ESPECIALLY AUTOMOTIVE GEARSHIFT LINKAGES

[75] Inventors: Peter Muth, Nieder-Olm; Wolfgang Hartung, Wiesbaden; Friedhelm Krake, Russelsheim; Marion Furche, Mainz, all of Fed. Rep. of Germany

[73] Assignee: General Motors Corporation, Detroit, Mich.

[21] Appl. No.: 472,745

[22] Filed: Mar. 7, 1983

[30] Foreign Application Priority Data

Mar. 19, 1982 [DE] Fed. Rep. of Germany ....... 3210107

[51] Int. Cl.³ .............................................. G05G 9/18
[52] U.S. Cl. ..................................... 74/473 R; 74/470
[58] Field of Search ............. 74/524, 519, 523, 473 R, 74/470; 180/328, 89.14

[56] References Cited

U.S. PATENT DOCUMENTS

| | | | |
|---|---|---|---|
| 1,881,843 | 10/1932 | Morley | 74/473 R |
| 3,406,586 | 10/1968 | Hobbins | 74/473 P |
| 4,323,356 | 4/1982 | Stephenson | 74/473 R |

FOREIGN PATENT DOCUMENTS

| | | | |
|---|---|---|---|
| 2658019 | 7/1978 | Fed. Rep. of Germany | 74/473 R |
| 2270115 | 12/1975 | France | 180/89.14 |
| 57-178514 | 11/1982 | Japan | 74/470 |

Primary Examiner—Alexander Grosz
Assistant Examiner—Adrian H. Whitcomb, Jr.
Attorney, Agent, or Firm—Donald F. Scherer

[57] ABSTRACT

A decoupling mechanism is provided by incorporating a connecting element into the gearshift linkage disposed between the transmission and gearshift lever. A relatively simple and compact decoupling device is provided for effectively eliminating gear jumping. For this purpose, segmental sleeve portions having internally toothed gear means are axially coupled with the gearshift rod disposed on the side of the gearshift lever, but are adapted for radial inward displacement against the force exerted by springs through cams provided on the tubular casing. Externally toothed gear means are provided on the gearshift rod disposed on the transmission side in the area of the sleeve portions.

11 Claims, 5 Drawing Figures

FIG.2

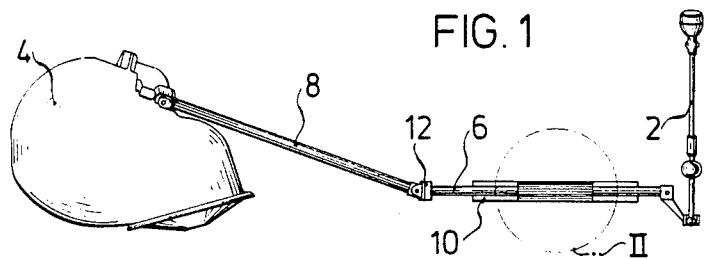
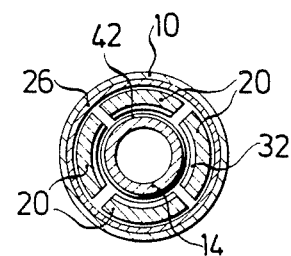
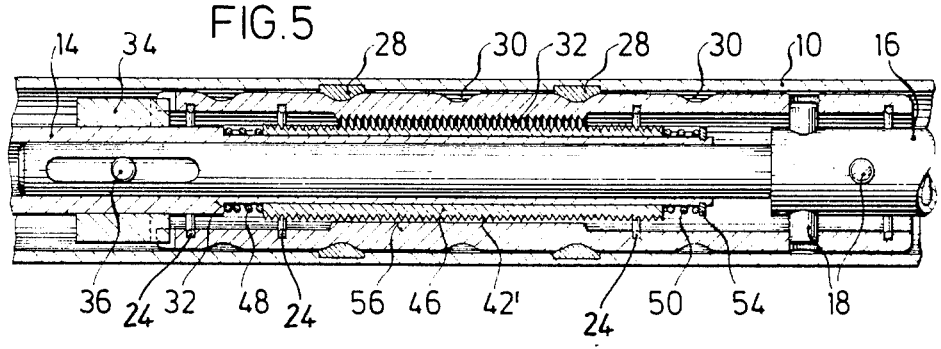

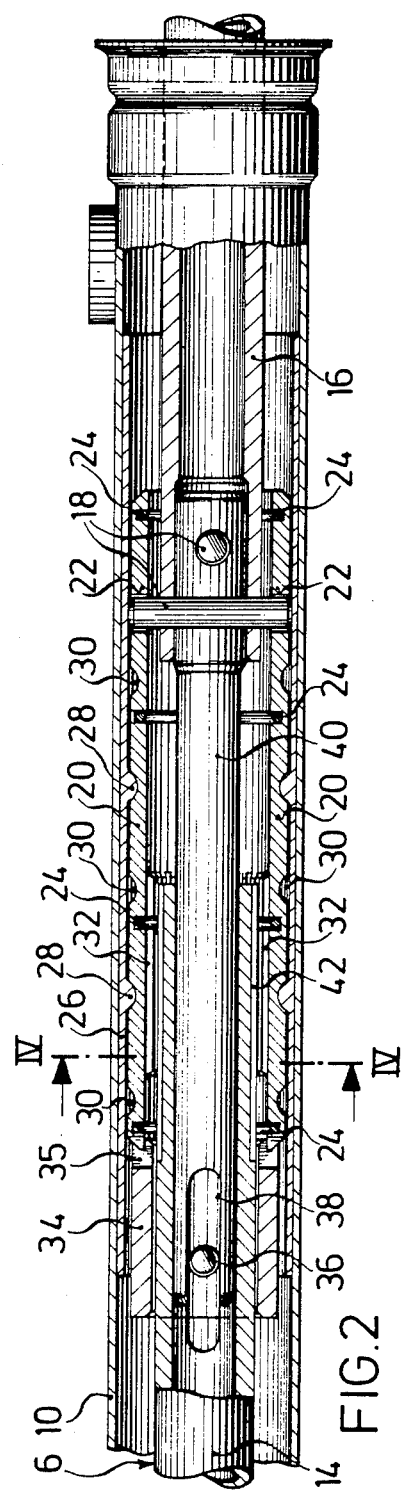
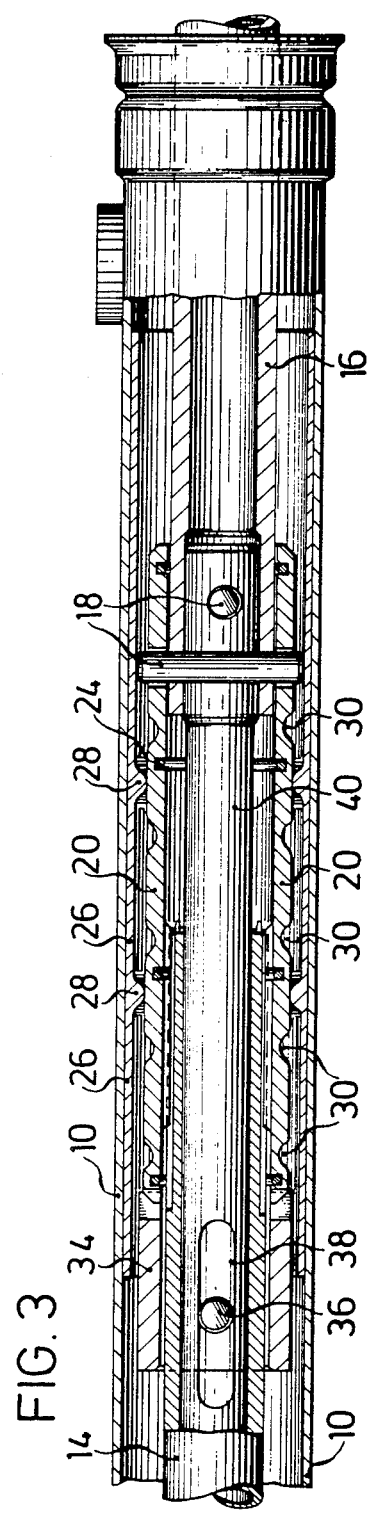
FIG.2
FIG.3

CONNECTING ELEMENT FOR LINKAGES, ESPECIALLY AUTOMOTIVE GEARSHIFT LINKAGES

This invention relates to a connecting element for linkages, especially for gearshift linkages disposed between the transmission and the gearshift lever of a motor vehicle, said connecting element being in the form of a decoupling device and being disposed between two gearshift rods so as to permit, after shifting into a gear, forward and backward movement of the decoupled gearshift rod, the operative connection of the ends of gearshift rod being effected by way of gearing which is operatively associated with the respective ends of the gearshift rods and adapted for engagement with and disengagement from one another.

In the prior art disclosed in U.S. Pat. application Ser. No. 472,744 assigned to the assignee of this application, the operative connection of the gearshift rods that are in mesh with one another is by way of a pivotally mounted spring-loaded pawl, and in accordance with one embodiment thereof, it is proposed to provide the pawl with gearing means for cooperation with gearing means on a second pawl or the like. This prior art provides a simple and compact decoupling device by which gear jumping is effectively eliminated.

In accordance with the improvement provided by the present invention, the gearing means on the gearshift rod disposed on the side of the shift lever is in the form of internal toothing provided on one or more segmental sleeve portions which are axially coupled with the gearshift rod and which are radially inwardly displaceable against a spring bias by way of cam like projections on the tubular casing or the like, and the gearing means on the gearshift rod disposed on the transmission side is in the form of external toothing in the area of the sleeve portions.

In contrast to the prior art, the present invention provides that the displacement of the sleeve portion or portions provided with gearing means proceeds parallel towards the other gearing, so that when the latter gearing is fixed relative to the direction of movement of the sleeve portion, the individual teeth will engage uniformly even in the case of a relatively long tooth segment. Thus, one of the gearing means may then be provided directly on the shift rod.

It may be advantageous, primarily for reasons of compactness, that the four segmental sleeve portions be circumferentially disposed at equal distances from one another, and that the respective oppositely disposed pairs of sleeve portions be provided with a bore near their respective ends for insertion of a pin which is projecting out of the circumferential surface of the gearshift rod disposed towards the gearshift lever and, furthermore, that the sleeve portions be adapted for parallel outward displacement against the tubular casing by way of a spring force.

In order to effect radial inward movement of the sleeve portions, i.e., towards the external gearing, the tubular casing, or a cylindrical element disposed thereon, is provided with two axially spaced apart annular beads, and the sleeve portions are provided at half the distance between the annular beads with five corresponding annular grooves.

In order to provide the necessary relationship of rotary movement between the two gearshift rods for selecting the gear ratios, the gearshift rod disposed towards the side of the gearshift lever is rigidly connected at its end with a guide rod forming an extension of said gearshift rod. The guide rod extends into the tubular gearshift rod disposed on the transmission side and is mounted for rotation therewith but free for relative axial displacement. The guide rod may also be formed integrally with the shift rod disposed on the shift lever side. However, for reasons related to manufacturing technique, it is preferable that the guide rod be made as a separate part and be coupled to the shift rod by means of, for instance, the pins provided on the gearshift rod and engaging with the sleeve portions.

If the gearing, i.e., the teeth are unfavorably positioned with respect to one another at the instant of engagement, the meshing of the teeth may become difficult and require increased force on the part of the operator, because the bevelled teeth make it necessary that there be first a relative motion between the gear elements. In order to facilitate the meshing of the gears it is proposed, in accordance with another feature of the invention, that the external gearing be "decoupled" from the gearshift rod disposed on the transmission side, i.e., the external gearing is provided on a sleeve which is mounted on the gearshift rod disposed on the transmission side and adapted for axial displacement against the bias exerted by springs.

Other features of the invention will become apparent from the following description and claims wherein:

FIG. 1 is an engine/transmission arrangement including a transmission control linkage and a gearshift lever;

FIG. 2 is an enlarged scale of detail II in cross section;

FIG. 3 is the arrangement of FIG. 2 shown in the engaged position;

FIG. 4 is a section along line IV—IV of FIG. 2; and

FIG. 5 is another embodiment.

FIG. 1 illustrates a gearshift lever 2 and a transmission 4 of a motor vehicle as well as the associated gearshift rods 6 and 8. The rearwardly disposed gearshift rod 6 is surrounded by a tubular casing 10 and provided at its forward end with a universal joint 12 for the gearshift rod 8 attached to the transmission housing 4. The decoupling device is mounted in the tubular casing 10 within the dash-dotted circular area.

FIGS. 2 and 3 are illustrations of the coupling device. The tubular casing 10 is attached to the chassis or any part thereof in a fashion not illustrated in detail. Instead of the tubular casing 10, it is also conceivable to use any other suitable element that is to be rigidly connected to the chassis. The gearshift rod 6 used in combination with the decoupling device is split up into two separate gearshift rods which are identified in the following text by the numerals 14 and 16 for the gearshift rod disposed on the transmission side and the gearshift lever side, respectively.

The gearshift rod 16 disposed on the gearshift lever side has attached to its end two radially arranged, 90° offset bolts 18 which project past the circumference of said gearshift rod 16. Connected with said bolts 18 and thus with the gearshift rod 16 are four segmental sleeve portions 20 which are spaced circumferentially at equal distances from one another, as illustrated in FIG. 4.

Two respective oppositely disposed sleeve portions 20 are provided with a bore 22 each for receiving the ends of the associated bolt 18. Thus, the sleeve portions 20 are axially coupled with the gearshift rod 16 but are adapted for displacement in radial direction. The sleeve portions 20 are subjected to the force exerted by four annular springs 24 which are urging the sleeve portions radially outwardly against the tubular casing 10 or a tubular insert 26.

The tubular insert 26 in the tubular casing 10, which extends over the length of the sleeve portions 20, is provided with two annular beads 28 which are spaced at a predetermined distance from one another. As illustrated in FIGS. 2 and 3, the sleeve portions 20 are provided with five corresponding annular grooves 30 which are spaced at a distance corresponding to half of that provided between the beads 28. In FIG. 2, the annular beads 28 are engaging with the respective second annular grooves 30 of the sleeve portions 20, as viewed from the outer side. Each sleeve portion 20 is provided with internal gearing or toothed portion 32. The sleeve portions 20 are guided with their ends facing away from bolt 18 in a centering ring 34 by having their ends extend into slots 35 of the centering ring 34. The centering ring 34 is mounted on the gearshift rod 14 disposed on the transmission side and is connected for rotation therewith by means of a radially disposed pin 36. The pin 36 extends through longitudinal slots 38 of gearshift rod 14 so that the gearshift rod 14 is axially displaceable with respect to the centering ring 34.

A guide rod 40, which is rigidly connected with gearshift rod 16 by pins 18, is extending into the gearshift rod 14. At the end of the guide rod extending into the gearshift rod 14 there is provided the pin 36 which connects the guide rod 40 with the centering ring 34. The gearshift rod 14 is provided with external gearing or toothed portion 42 which extends from the centering ring 34 to its free end.

The mechanism operates as follows. The position illustrated in FIG. 2 is the idling position in which the sleeve portions 20 are being urged outwardly against the insert 26 by springs 24. The sleeve portions 20 are in a mid-position with respect to the annular beads, as viewed in axial direction. The internal gearing 32 is out of mesh with the external gearing 42 of gearshift rod 14 which, as a result, is free to move in axial direction without transmitting its movement to the gearshift rod 16. After selecting the shift plane, which occurs when the gearshift rods 14 and 16 are subjected to a corresponding rotary movement, the gearshift rod 16 is being moved to the left or the right, depending upon the gear to be selected by the operator. During this procedure, the sleeve portions 20 are caused to move radially inwardly by way of the annular beads 28, and their internal gearing 32 will mesh with the external gearing 42 of the gearshift rod 14, as illustrated in FIG. 3. In FIG. 3, the gearshift rods 14 and 16, which are now connected with one another, are moving to the left for shifting, for instance, into fourth gear, and the illustration shows the shifting path being about half way completed. The shifting movement is terminated when the outermost annular groove 30 disposed to the right has moved into alignment with the righthand annular bead 28, i.e., when the medially disposed annular groove 30 is in alignment with the lefthand annular bead 28. At this stage, the sleeve portions 20 are again moved outwardly by the springs 24, whereby the sleeve portions 20 are being put out of mesh with the gearshift rod 14 disposed on the transmission side. Thus, the connection between the gearshift rod 16 and the gearshift rod 14 is suspended again, and, as a result, gear jumping is effectively eliminated.

The embodiment of FIG. 5 differs from the one of FIGS. 2 and 3 in that the external gearing or toothed portion 42', rather than being disposed directly on gearshift rod 14, is provided on a sleeve 46. The sleeve 46 is mounted on a portion of the gearshift rod 14 which is of a smaller diameter than the remainder of the gearshift rod. The sleeve 46 is retained in a mid-position by a pair of springs 48 and 50 which are exerting a force on the sleeve 46 and which bear upon a shoulder 52 or a snap ring 54.

The sleeve portions 20 in this embodiment are also provided with five annular grooves 30 which cooperate with the two annular beads 28, but the beads 28 are directly disposed on the tubular casing 10. As in the first embodiment, the sleeve portions are provided with internal gearing 32. However, the lower sleeve portion 20 does not have a toothed portion but, instead, there is merely provided a bearing element 56. The mechanism functions in the same fashion as that of the first embodiment, except that as the internal gearing 32 meshes with the external gearing 42', the latter, i.e., the sleeve 46, is adapted for displacement relative to the gearshift rod 14.

The embodiments of the invention in which an exclusive property or privilege is claimed are defined as follows:

1. Connecting elements for linkages, especially for gearshift linkages disposed partially in a tubular casing between the transmission and gearshift lever of motor vehicles, said connecting element being in the form of a coupling device located between two gearshift rods and being adapted to permit forward and backward movement of the decoupled gearshift rod after the vehicle has been shifted into a gear, the effective connection between the ends of the gearshift rods being by way of gearing operatively associated with the respective gearshift rod ends, and said gearing being adapted to be put in and out of mesh with one another, the improvement comprising: the gearing on the gearshift rod disposed on the side of the gearshift lever being in the form of internal gearing provided on one or more segmental sleeve portions which are axially coupled with the gearshift rod and which are radially inwardly displaceable against the force of springs through cam like projections provided on the tubular casing or the like, and the gearing being provided on the gearshift rod located on the transmission side and being disposed in the area of the sleeve portions.

2. Connecting elements according to claim 1, the improvement comprising: four segmental sleeve portions being circumferentially spaced at equal distances from one another, and each of the two respective sleeve portions opposing one another being provided near one of its ends with a bore for receiving a pin that extends past the circumference of the gearshift rod provided on the gearshift lever side, and the sleeve portions being adapted for parallel outward displacement against the tubular casing.

3. Connecting elements according to claim 1, the improvement comprising: the tubular casing being provided with two axially spaced annular beads, and the sleeve portions being provided at half the distance of the annular beads with five corresponding annular grooves.

4. Connecting elements according to claim 1, the improvement comprising: the gearshift rod disposed on the shift lever side being rigidly connected at its end with a guide rod forming an extension thereof, said guide rod extending into the tubular gearshift rod disposed on the transmission side and being connected for rotation therewith but axially displaceable relative thereto.

5. Connecting elements according to claim 4, the improvement comprising: the segmental sleeve portions being guided on the side of the gearshift rod disposed on the transmission side by way of a centering ring mounted thereon which is connected for rotation with the guide rod and the gearshift rod disposed on the transmission side.

6. Connecting elements according to claim 5, the improvement comprising: the gearshift rod disposed on the transmission side being provided at its end facing the gearshift rod disposed on the gearshift lever side with a gearing which is disposed directly on the surface of said gearshift rod, and the centering ring being disposed adjacent to said gearing.

7. Connecting elements according to claim 5, the improvement comprising: a radially disposed pin being provided on the end of the guide rod extending into the gearshift rod, said pin projecting through axially extending elongated apertures in the gearshift rod and into transverse apertures of the centering ring.

8. Connecting elements according to claim 1, the improvement comprising: the length of the gearings on the sleeve portions and the gearshift rod corresponding to at least twice the diameter of the gearshift rod.

9. Connecting elements according to claim 8, the improvement comprising: the gearing on the transmission side gearshift rod being provided on a sleeve which is mounted on the gearshift rod disposed on the transmission side and which is adapted for sliding movement thereon against the bias exerted by spring means.

10. Connecting elements according to claim 9, the improvement comprising: the sleeve being mounted on the end of the gearshift rod that is provided with a reduced diameter, and said spring means including a first helical compression spring being disposed between the sleeve and a collar on the one side, and a second helical coil spring being disposed between the sleeve and a locating ring on the other side.

11. A linkage for use in shifting a power gear transmission comprising: a shift lever; an input link connected to said shift lever including a plurality of axially extending internally toothed annular segments; an output link extending coaxially within said input link and including an externally toothed portion adapted to engage with said annular segments; spring means expanding said annular segments to disengage the toothed portions of said input and output links during gear engagement to permit relative axial movement therebetween; housing means enclosing an axially extending portion of said input link; and cam means coacting between said input link and said housing means for contracting said annular segments to enforce engagement of said tooth portions when said input link is moved axially relative to said housing means to provide unitary axial movement of said input and output links during gear ratio changes.

* * * * *